Oct. 14, 1930. R. LINTON ET AL Re. 17,825

ANTIGLARE REFLECTOR

Original Filed March 9, 1928

INVENTOR
Reginald Linton
William John Jarvis
BY H. Lee Helm
ATTORNEY

Reissued Oct. 14, 1930 Re. 17,825

UNITED STATES PATENT OFFICE

REGINALD LINTON AND WILLIAM JOHN JARVIS, OF SYDNEY, NEW SOUTH WALES, AUSTRALIA, ASSIGNORS TO THE EGARSOL GLARELESS REFLECTOR CO. LTD., OF SYDNEY, AUSTRALIA, A CORPORATION OF NEW SOUTH WALES

ANTIGLARE REFLECTOR

Original No. 1,751,934, dated March 25, 1930, Serial No. 260,383, filed March 9, 1928, and in Australia November 3, 1927. Application for reissue filed August 15, 1930. Serial No. 475,578.

This invention relates to anti-glare reflectors, employed in conjunction with a light source, preferably of the incandescent type, and is especially applicable to motor and other vehicles.

Briefly stated the objects of the invention are to provide a safe and efficient light for driving at night; to produce a soft widely diffused light directly in front of the vehicle; and at the same time a flat penetrating light extending ahead of the diffused light.

The light source is positioned as ordinarily at the focal point of the reflector which is capable of light projection forwardly or outwardly to a degree according to the candle-power of said light source. The reflector is capable also of illuminating objects on either side for a distance directly in front of the lamp, approximately equal to one fourth of the length of the visibility ahead. This side diffusion of light is of about equal intensity to that obtained forwardly of the lamp.

Further, the illumination obtained from the reflector produces a carpet or spread of light free from shadow, and is entirely free from movement due to any motion of the vehicle when negotiating irregular surfaces. The light projected from our reflector has the effect of reducing to a minimum glare or the blinding effects caused by the usual reflectors on the optic nerve.

According to the invention, it comprises a concave reflector embodying a differential degree of finish. The area of the reflector from the apex to about half of the distance from the base, consists of a plurality of polished facets, or independent mirror surfaces, inclined at suitable angles to each other, thus causing a series of beams or shafts of light reflected from each facet or mirror obtaining light from the light source. These beams mingle with reflected light obtained from that area of the reflector where the facets or mirrors end, to its base, which consists of a matt, satin, or granulated finish, capable of projecting light in all directions. This is due to the multiplicity of minute reflecting surfaces on the matt or like area, also to the gradual disintegration of reflected light rays from each of the facets, combining with the total disintegration of light rays reflected from the matt surface and merging of the different degrees of reflected light.

When we employ the apex of the reflector for the inclusion of highly burnished or plated facets or surfaces for use in lamps in a lateral or horizontal position, left and right additional facets are included in an area equal to about one fourth, or one third of the total apex surface, and preferably gradually increasing in size from the centre outwardly.

But in order that the invention may be more readily understood, reference will now be made to the accompanying drawings in which is illustrated a practical form of our reflector.

Figure 1:
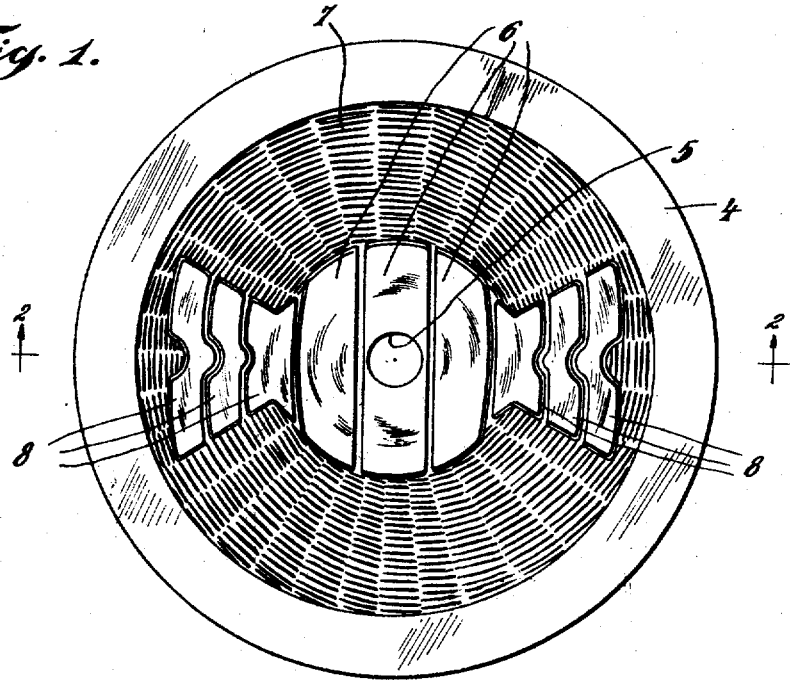
Figure 1 is a plan view of the complete reflector showing the respective polished and matt surface portions.
Figure 2:
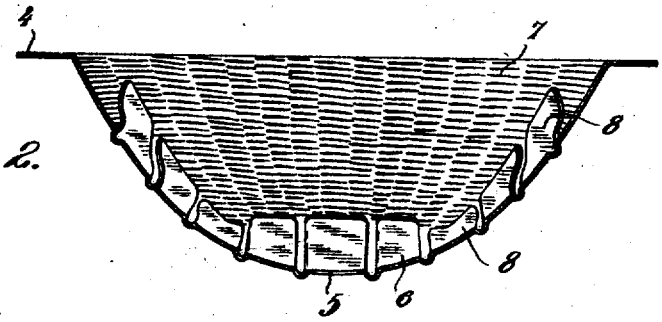
Figure 2 is a section on the line 2—2 of Figure 1 showing the manner in which the polished surfaces are indented by pressing to form the facets.
Figure 3:
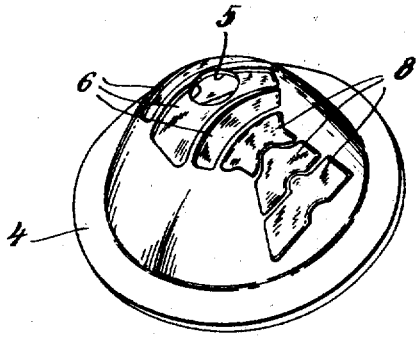
Figure 3 is a perspective view looking on the rear side of the reflector and also showing the manner in which the facets are formed.

The reflector which has an inner concave surface is formed with a flange 4, and a central opening 5 to accommodate the usual lamp socket.

The central portion of the reflector has a plurality of highly polished or reflecting facets 6 disposed at an angle to one another, the remaining portion 7 of the reflector surface being matt or non-highly polished except where additional or side facets 8 are provided for the purpose of producing a wide beam of light, in addition to a long pentrating beam from the central portion of the reflector.

By this construction, a soft widely diffused light is produced directly in front of the car or other object to which the reflector is fitted, and owing to portion of the reflector having a matt surface the beams of light from the facets mingle with the reflected light from the matt surface and produce a practically glareless light.

We may construct our reflector in two parts, viz, an outer or rear shell formed or indented with facets on its inner face and an inner or front shell adapted to take in the former and having lateral cuts and a mat surface as described.

We claim:

1. An anti-glare concave reflector, comprising a plurality of embossed transversely flattened and polished surfaces adjacent to the center of the reflector for the purpose of reflecting a beam of light from a light source within the reflector, that will penetrate a long distance ahead, a mat or non-highly polished surface above and below the said embossed polished surfaces for producing a soft widely diffused beam of light directly in front of the reflector, and highly polished embossed transversely flattened portions disposed on each side of the central embossed portion, whereby a wide penetrating beam of light is reflected.

2. An anti-glare concave reflector, comprising a reflector body, a plurality of highly polished transversely flattened facets disposed within the central portion of said reflector body for the purpose of reflecting a penerating beam of light from a light source within the reflector, a plurality of transversely flattened and highly polished surfaces disposed on each side of the central portion of the reflector body for the purpose of reflecting a flat penetrating beam of light and a mat or non-highly polished surface disposed above and below the said highly polished surfaces for the purpose of reflecting a soft widely diffused beam of light close to the reflector.

In testimony whereof, we have hereunto set our hands.

REGINALD LINTON.
WILLIAM JOHN JARVIS.